US008787132B2

(12) United States Patent
Saito et al.

(10) Patent No.: US 8,787,132 B2
(45) Date of Patent: Jul. 22, 2014

(54) METHOD AND APPARATUS FOR INSPECTING THERMAL ASSIST TYPE MAGNETIC HEAD

(71) Applicant: Hitachi High-Technologies Corporation, Tokyo (JP)

(72) Inventors: Naoya Saito, Kamisato-machi (JP); Shinji Honma, Kamisato-machi (JP); Teruaki Tokutomi, Kamisato-machi (JP); Yoshinori Kitano, Kamisato-machi (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/964,455

(22) Filed: Aug. 12, 2013

(65) Prior Publication Data

US 2014/0092716 A1 Apr. 3, 2014

(30) Foreign Application Priority Data

Sep. 28, 2012 (JP) ................................. 2012-216339

(51) Int. Cl.
*G11B 7/00* (2006.01)
(52) U.S. Cl.
USPC ................... 369/53.1; 369/13.32; 369/13.33; 369/126
(58) Field of Classification Search
None
See application file for complete search history.

(56) References Cited

U.S. PATENT DOCUMENTS

| 7,697,382 | B2 * | 4/2010 | Mizutani et al. ........... 369/44.23 |
| 8,278,917 | B2 | 10/2012 | Nakagomi et al. |
| 8,359,661 | B2 | 1/2013 | Tachizaki et al. |
| 8,654,618 | B1 * | 2/2014 | Liu et al. .................... 369/13.33 |
| 2011/0170381 | A1 | 7/2011 | Matsumoto |
| 2012/0054924 | A1 * | 3/2012 | Zhang et al. ...................... 850/6 |
| 2012/0307605 | A1 * | 12/2012 | Zhang et al. ............... 369/13.32 |

FOREIGN PATENT DOCUMENTS

| JP | 2006-038774 A | 2/2006 |
| JP | 2009-230845 A | 10/2009 |
| JP | 2010-175534 A | 8/2010 |
| JP | 2011-146097 A | 7/2011 |

* cited by examiner

*Primary Examiner* — Muhammad N Edun
(74) *Attorney, Agent, or Firm* — Mattingly & Malur, PC

(57) ABSTRACT

An apparatus for inspecting a thermal assist type magnetic head is configured to include a scanning probe microscope unit comprising a cantilever having a probe with a magnetic film formed on the surface of a tip portion thereof; a prober unit which provides an alternating current to a terminal formed on the thermal assist type magnetic head element; a scattered light detection unit which detects scattered light generated from the probe; and a signal process unit which detects defect by using an output signal from the scanning probe microscope unit by scanning the surface of the thermal assist type magnetic head element with the probe in a state that the magnetic field is generated and the near-field light is stopped, and an output signal from the scattered light detection unit by scanning the surface with the probe while near-field light is generated and the magnetic field is off.

10 Claims, 10 Drawing Sheets

METHOD AND APPARATUS FOR INSPECTING THERMAL ASSIST TYPE MAGNETIC HEAD

BACKGROUND

The present invention relates to a method for inspecting a thermal assist type magnetic head which inspects thermal assist type magnetic head, and an apparatus for inspecting a thermal assist type magnetic head, and in particular to, in the techniques such as optical microscopes, a method and apparatus for inspecting thermal assist type magnetic head which is capable of inspecting the state of generation of near-field light generated by a thermal assist type magnetic head which cannot be inspected.

As apparatuses which non-destructively inspect magnetic heads, a method using an optical microscope, a method using a scanning electron microscope (SEM), a method using an atomic force microscope (AFM), and a method using a magnetic force microscope (MFM), among others, have been employed.

Each of the methods mentioned above has its merits and demerits. Since a magnetic field generated by a magnetic head for writing on a hard disk can be non-destructively inspected, the method using a magnetic force microscope (MFM) is advantageous over the methods using observation means by other systems.

Using this magnetic force microscope (MFM), measuring the effective track width of a write track in a state of a row bar in which a plurality of magnetic head elements are placed side by side before the magnetic head elements formed on a wafer are separated individually, for example, is described in Japanese Unexamined Patent Publication No. 2010-175534 (patent document 1). That is, patent document 1 describes generating a magnetic field by applying a current to a magnetic head circuit pattern of a sample, i.e., a row bar, and a magnetic probe attached to a cantilever is approached to this magnetic field generating by performing two-dimensional measurement of the magnetic field generated by the sample by two-dimensionally scanning the cantilever to detect the displacement magnitude of the probe of the cantilever.

Moreover, Japanese Unexamined Patent Publication No. 2009-230845 (patent documents 2) describes a conventional magnetic head inspection as follows: in a magnetic head inspection, a record signal (signal for magnetization) is inputted into a thin film magnetic head in a magnetic head row bar state from a bonding pad. The situation of the magnetic field generated from the recording head (element) contained in the thin film magnetic head is observed while the thin film magnetic head is scanned and moved in the position corresponding to the floating height of the magnetic head. The situation of this magnetic field is directly observed under a magnetic force microscope (MFM), a scanning hall probe microscope (SHPM), or a scanning magneto-resistive effect microscope (SMRM). This allows measurement of not physical forms but the magnetic field configuration generated, and non-destructive inspection of magnetic effective track widths. Japanese Unexamined Patent Publication No. 2009-230845 (patent documents 2) describes achieving measurement of the effective track widths in the state of a row bar by using a magnetic force microscope, which has been only possible in the state of HGA or pseudo-HGA using a spin stand.

In contrast, as new techniques for next-generation hard disks for which dramatically higher capacities are demanded, magnetic recording methods by thermal assist have been drawing attention and are increasingly developed in many companies. Increasing densities and capacities of hard disks requires reduction in their track widths, which are said to have almost reached their limits in magnetic heads of conventional systems, but employing a magnetic head of the thermal assist method using near-field light as a heat source allows realization of a track width of about 20 nm.

In this thermal assist magnetic recording head, near-field light is generated using a conductive structure having such a cross sectional shape that the width in the direction perpendicular to the polarization direction of incident light propagating through a waveguide gradually decreases towards the vertex where the near-field light is generated, and, its width decreases gradually or stepwise towards the vertex where the near-field light is generated in the direction of travel of the incident light. A configuration in which the waveguide is disposed next to a structure having conductivity, and near-field light is generated via surface plasmon generated on the side face the structure having conductivity is described in Japanese Unexamined Patent Publication No. 2011-146097 (patent document 3).

However, the effective intensity distribution and size of the near-field light which serve as significant factors for this track width cannot be measured from surface shapes observed with optical microscopes and SEMs. Therefore, inspection methods are important issued which are left unsolved.

In contrast, as a technique for detecting this near-field light, patent document 4 discloses "Near-field optical microscope (also referred to as SNOM: Scanning Near-field Optical Microscopy, NSOM: Near-field Scanning Optical Microscopy, NOM: Near-field Optical Microscopy)", which can detect near-field light and determine its configuration by approaching a scanning type probe to the near-field light, and scattering the near-field light.

SUMMARY

Patent document 1 describes measurement of the two-dimensional magnetic field distribution formed by individual magnetic head elements in a row bar of a magnetic head by performing two-dimensional scanning with a cantilever having a probe, but the document does not refer to the configuration for measuring the near-field light and magnetic field generated by a thermal assist type magnetic head, and a method for the same.

In conventional magnetic recording, the size of a magnetic field generation part is the track width, and therefore the track width of the head can be inspected by measuring a magnetic field according to the method in patent document 1. However, it is difficult for such a method to inspect a thermal assist head, in which the size of near-field light generated is the track width.

Moreover, in the magnetic head inspection apparatus which inspects the magnetic effective track width by measuring the shape of the magnetic field generated in the state of the row bar described in patent document 2, the constitution and method for measuring near-field light and magnetic field generated by a thermal assist type magnetic head are not mentioned.

In contrast, patent document 3 describes the structure of a thermal assist magnetic recording head and a magnetic recording apparatus incorporating this head, but the document does not refer to inspecting near-field light and magnetic field generated by the thermal assist magnetic recording head.

Furthermore, patent document 4 describes detecting the near-field light and the other light while distinguishing both from each other in the vicinity of a near-field light emitting element, but does not refer to inspecting the near-field light and magnetic field generated by a thermal assist magnetic recording head.

The present invention provides a method and apparatus for inspecting a thermal assist type magnetic head element which allow measurement of a magnetic field and a near-field light generation region generated by the thermal assist type magnetic head highly accurately in a state that the influence of the heat generation of a near-field light generation region is reduced as much as possible.

In order to solve the problems described above, in the present invention, an apparatus for inspecting a thermal assist type magnetic head is configured to include a scanning probe microscope unit including X and Y tables on which a thermal assist type magnetic head element is to be mounted and being movable in an XY plane, and a cantilever having a probe with a magnetic film formed on the surface of a tip portion thereof; a prober unit which supplies an alternating current to a terminal formed on the thermal assist type magnetic head element mounted on the X and Y tables, and causes a pulse laser pulse drive current or pulse drive voltage to be incident in a near-field light emitting part formed on the thermal assist type magnetic head element; an imaging unit which picks up images of the prober unit and the thermal assist type magnetic head element; an image display unit which displays the images of the probe unit and the thermal assist type magnetic head element taken by the imaging unit; a scattered light detection unit having a light detector which detects scattered light generated from the probe of the cantilever when the probe is present in a generation region of near-field light generated from the near-field light emitting part formed on the thermal assist type magnetic head element; a signal processing unit which processes an output signal from the scanning probe microscope unit and an output signal from the scattered light detection unit to inspect the thermal assist type magnetic head element, the scanning probe microscope unit outputs the signal by, in a state that the incidence of laser in the near-field light emitting part from the prober unit is stopped and providing an alternating current to the terminal of the thermal assist type magnetic head element to generate a magnetic field on the surface thereof, scanning the surface of the thermal assist type magnetic head element with the probe of the cantilever, and the scattered light detection unit outputs the signal by scanning the probe of the cantilever on the surface of the thermal assist type magnetic head element while generating near-field light from the near-field light emitting part by applying the pulse drive current or pulse drive voltage to the near-field light emitting part from the prober unit in a state that the supply of an alternating current to the terminal is stopped.

Moreover, in order to solve the problems described above, in the present invention, the method for inspecting a thermal assist type magnetic head includes mounting a thermal assist type magnetic head element on X and Y tables of a scanning probe microscope, the scanning probe microscope comprising a cantilever and the X and Y tables, the cantilever having a probe in a tip portion thereof, the probe having a magnetic film formed on the surface thereof, the X and Y table being movable in an XY plane; providing an alternating current to the terminal and the thermal assist type magnetic head element formed on the thermal assist type magnetic head element mounted on the X and Y tables to generate a magnetic field; in a state that a magnetic field is generated in the thermal assist type magnetic head element, scanning the surface of the thermal assist type magnetic head element with the probe of the cantilever of the scanning probe microscope to determine the distribution of the magnetic field generated; applying a pulse drive current or a pulse drive voltage to the near-field light emitting part formed on the thermal assist type magnetic head element mounted on the X and Y tables to generate the near-field light from the near-field light emitting part, in a state that the near-field light is generated from the near-field light emitting part; scanning the surface of the thermal assist type magnetic head element with the probe of the cantilever of the scanning probe microscope to condense and detect scattered light generated from the probe with an objective lens in the generation region of the near-field light; determining the light emission region and distribution of the near-field light from the scattered light detected; and judging the quality of the thermal assist type magnetic head based on the information of the determined distribution of the magnetic field and the determined light emission region and distribution of the near-field light.

Moreover, in order to solve the problems described above, in the present invention, the method for inspecting a thermal assist type magnetic head includes mounting a thermal assist type magnetic head element on X and Y tables of a scanning probe microscope, the scanning probe microscope comprising a cantilever and the X and Y tables, the cantilever having a probe in a tip portion thereof, the probe having a magnetic film formed on the surface thereof, the X and Y table being movable in an XY plane; in a state that the application of a pulse drive current or a pulse drive voltage to a near-field light emitting part formed on the thermal assist type magnetic head element mounted on the X and Y tables is stopped, applying an alternating current to a terminal formed on the thermal assist type magnetic head element and scanning the surface of the thermal assist type magnetic head element in a first direction with the probe of the cantilever of the scanning probe microscope while generating a magnetic field in the thermal assist type magnetic head element to determine the distribution of the magnetic field generated; in a state that application of an alternating current to the terminal formed on the thermal assist type magnetic head element mounted on the X and Y tables is stopped; applying a pulse drive current or a pulse drive voltage to the near-field light emitting part and scanning the surface of the thermal assist type magnetic head element in a second direction opposite to the first direction with the probe of the cantilever of the scanning probe microscope while generating near-field light from the near-field light emitting part to condense and detect scattered light generated from the probe with an objective lens in the generation region of the near-field light and determining a light emission region and distribution of the near-field light from the detected scattered light; and judging the quality of the thermal assist type magnetic head based on information of the determined distribution of the magnetic field and the determined light emission region and distribution of the near-field light.

According to the present invention, by scanning the inspection region for the magnetic field and near-field light generated from the thermal assist type magnetic head element with the scanning probe microscope once, the magnetic field and near-field light generated from the thermal assist type magnetic head element can be inspected with no thermal damage to the thermal assist type magnetic head element, and therefore an increase in the inspection efficiency of the thermal assist type magnetic head element is achieved.

These features and advantages of the invention will be apparent from the following more particular description of preferred embodiments of the invention, as illustrated in the accompanying drawings.

DESCRIPTION OF THE PREFERRED EMBODIMENTS

The present invention relates to a method and apparatus for inspecting a magnetic head element using, in a state of a row bar before the thermal assist type magnetic head element is individually separated, or in a state of a head assembly that the thermal assist type magnetic head elements are cut from the row bar and separated individually and mounted on a gimbal, an apparatus which inspects light emission state of near-field light generated by the thermal assist type magnetic head element and the distribution of a magnetic field applying a scanning probe microscope.

The mode for carrying out the invention (embodiment) will be described below in the case where a row bar before the thermal assist type magnetic head elements are individually separated is inspected with reference to drawings.

Figure 1A:
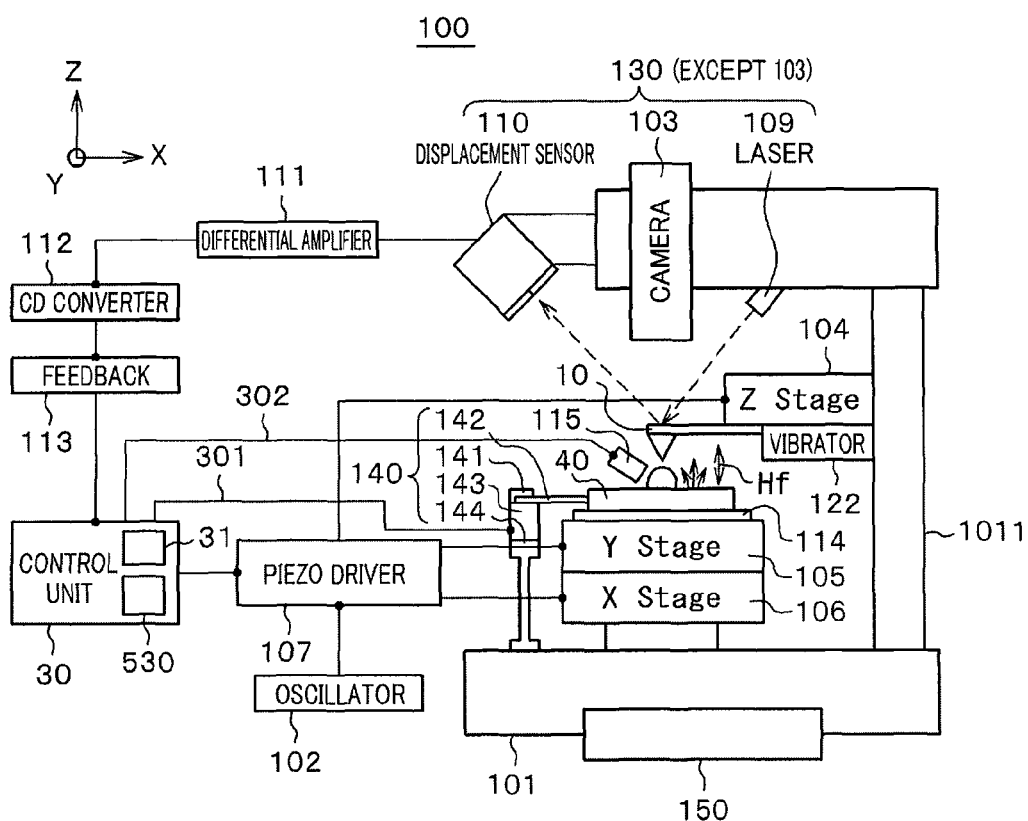
FIG. 1A is a block diagram showing the constitution of the outline of an inspection unit of a thermal assist type magnetic head element in an embodiment of the present invention.

FIG. 1A shows the constitution of the apparatus for inspecting the thermal assist type magnetic head element based on this Example.

An apparatus for inspecting a thermal assist type magnetic head 100 according to this Example is, in the manufacturing process of the magnetic head elements, capable of measuring the intensity distribution of the near-field light generated by the thermal assist type magnetic head element in the state of the row bar 40 (block in which a plurality of head sliders are arranged) in the step before a single slider (thin film magnetic head chip) is cut out by processing a wafer on which a number of thin film magnetic head elements are formed. Normally, the row bar 40 which has been cut out from a wafer on which a number of thin film magnetic head elements are formed as a long and narrow block measuring about 3 cm to 10 cm has such a constitution that about 40 to 90 of head sliders (thin film magnetic head elements) are arranged thereon. The row bar 40 has a built-in laser element which serves as a light emitting source.

The magnetic head element inspection apparatus 100 according to this embodiment is based on a scanning probe microscope. The magnetic head element inspection apparatus includes an inspection stage 101, and an X stage 106 and a Y stage 105 which are mounted on the inspection stage 101, capable of moving the row bar 40 in the X and Y directions for a minute distance, and are driven by a piezo element (not shown).

Figure 1B:
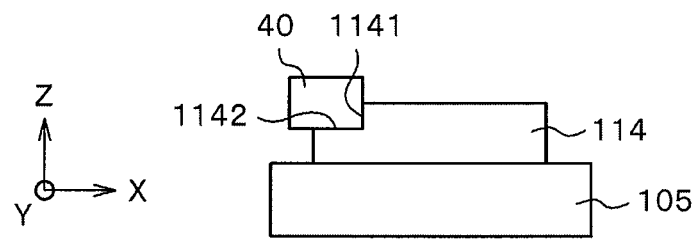
FIG. 1B is a side elevational view of rest of a rest for positioning the row bar mounted on the Y stage and the Y stage of an inspection unit of the thermal assist type magnetic head element according to an embodiment of the present invention.

The row bar 40 is positioned in the X direction as a side face thereof in the longitudinal direction is pressed against a reference face 1141 provided on a step portion 1142 of a rest 114 for positioning the row bar 40 provided on the top face of on the Y stage. The row bar 40, as shown in FIG. 1B, is placed in a predetermined position in the Z direction and the X direction by being brought into contact with a side (reference face) 1141 of this step portion 1142. The rear side face of the row bar 40 (the side face on which the magnetic head element electrodes 41 and 42 of the thermal assist type magnetic head elements are formed) is brought into contact with the side face (the reference face 1141) of the step portion 1142 so that the row bar 40 is positioned.

In the magnetic head element inspection apparatus 100 as shown in FIG. 1A, the camera for measuring the amount of misalignment 103 of the row bar 40 is provided above the Y stage 105 a Z stage 104, which is fixed to a column 1011 of the inspection stage 101, moves a cantilever 10 in the Z direction. The X stage 106, the Y stage 105, and the Z stage 104 of the inspection stage 101 are constituted by piezo stages driven by piezo elements, which are not shown.

The magnetic head element inspection apparatus 100 further includes a cantilever 10, a vibrator 122, a near-field light detection optical system 115, a displacement detecting element 130, a probe unit 140, an oscillator 102, a piezo driver 107, a differential amplifier 111, a DC converter 112, a feedback controller 113, and a control unit 30. Moreover, the control unit 30 includes a near-field light detection control system 530 which controls the near-field light detection optical system 115 thereinside.

The position of the cantilever 10 in the Z direction is controlled by the Z stage, and is vibrated at a predetermined frequency and predetermined amplitude by the vibrator 122 fixed to the Z stage 104.

The displacement detecting element 130 detects the state of vibration of the cantilever 10. The displacement detecting element 130 includes a laser light source 109 and a displacement sensor 110, and irradiates the cantilever 10 with the laser emitted from the laser light source 109, and detects the light regularly reflected at the cantilever 10 by a displacement sensor 110. A signal outputted from the displacement sensor 110 is transferred to the control unit 30 via the differential amplifier 111, the DC converter 112, and the feedback controller 113 and processed.

The probe unit 140 receives a signal 301 from the control unit 30, applies power and laser to an element which is a target of inspection of the row bar 40 mounted on the rest 114, and generates a magnetic field and near-field light on the element which is a target of inspection.

The near-field light detection optical system 115 detects the near-field light generated from the element which is a target of inspection of the row bar 40, and outputs detected signal 302 to the control unit 30.

The piezo driver 107 oscillates a piezo driving signal in response to a signal of the oscillator 102, and drives the X stage 106, the Y stage 105, and the Z stage 104.

In the above-described constitution, the control unit 30 controls the X stage 106, the Y stage 105, and the Z stage 104 via piezo driver 107 based on an image of the row bar 40 taken by the camera 103 to perform positioning adjustment so that the row bar 40 is in a predetermined position. When the positioning adjustment of the row bar 40 is completed, the probe unit 140 is driven based on an instruction from the control unit 30, and a tip portion of a probe 141 comes into contact with the magnetic head element electrodes 41 and 42 formed on the row bar 40.

Figure 2A:
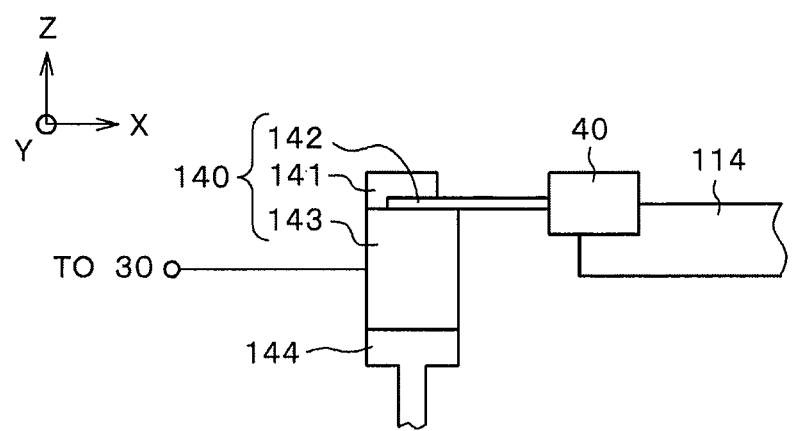
FIG. 2A is a side elevational view of the probe unit according to an embodiment of the present invention.
Figure 2B:
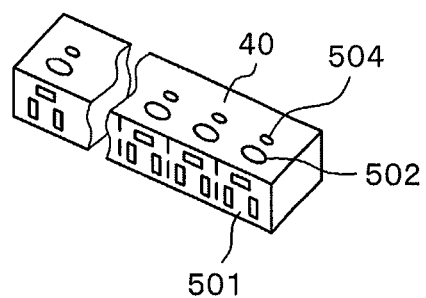
FIG. 2B is a perspective view of a row bar which is target of inspection according to an embodiment of the present invention.
Figure 2C:
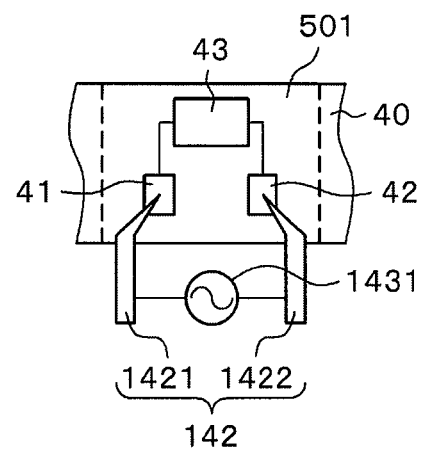
FIG. 2C is a plan view of a magnetic head element showing a state that the tip portions of a probe is brought into contact with the electrodes of a thermal assist type magnetic head element in an embodiment of the present invention.

The probe unit 140 has, as its side elevational view is shown in FIG. 2A, a probe card (or substrate) 141, has such a constitution that a probe 142 attached to the probe card 141 is fixed to a probe base 143, and the probe base 143 is supported on the inspection stage 101 by a supporting plate 144. In contrast, the row bar 40 is, as shown in the perspective view of FIG. 2B, a square bar-shaped substrate on which a number of a magnetic head elements 501 are formed, and as shown in FIG. 2C, an alternating current 1431 is applied in a state that the tip portions 1421 and 1422 of the probe 142 are held in contact with the magnetic head element electrodes 41 and 42 formed inside the row bar 40 of the magnetic head elements, whereby a magnetic field is generated from a write magnetic field generating part 502 of a write circuit portion 43 (refer to FIG. 4A). The frequency of the alternating current applied to the row bar 40 was caused to be different from the resonant frequency of the cantilever 10 so that it does not affect the vibration of the cantilever 10. Although omitted in the drawing, the row bar 40 also has a connection pad for connecting with a laser driver 531.

In such a state, the X stage 106 and the Y stage 105 are driven so that a scanning region 401 including the magnetic field generating part 502 is scanned with the cantilever 10, and a signal obtained by detecting changes in the amplitude of the cantilever 10 by the displacement detecting element 130 is processed by the control unit 30, whereby the distribution of the magnetic field generated from the write magnetic field generating part 502 of the row bar 40 can be measured at a high speed, and the width of the track to be written can be measured. The row bar 40 is sucked by a suction means (not shown) provided at the rest 114.

The probe card 141 is so configured to be movable in the X direction by a drive unit 143, and drives to perform the operation of sequentially contact and detachment of the tip portions 1421 and 1422 of the probe 142 and a number of magnetic head element electrodes 41 and 42 formed on the row bar 40.

In FIG. 3, the detailed constitution of the near-field light detection optical system 115 will be described in terms of the relationship with the near-field light detection control system 530 inside the control unit 30 and the cantilever 10. It should be noted that the spatial relationship between the row bar 40 and the cantilever 10 and the near-field light detection optical system 115 shown in FIG. 3 is opposite to that shown in FIG. 1A.

The cantilever 10 which vibrates by being driven by the vibrator 122 is, at the lowest end of vibration, positioned by the Z stage 104 so that a tip portion 5 of a probe 4 formed near the tip portion of the cantilever 10 is positioned at a height corresponding to a head floating height Hf from the surface of the thermal assist type magnetic head element portion 501 formed on the row bar 40. On the surface of the probe 4, a thin magnetic film 2 (for example, Co, Ni, Fe, NiFe, CoFe, NiCo, etc.) is formed. And on the surface of the thin magnetic film 2, minute particles or a thin film 3 of precious metals (for example, gold, silver, platinum, etc.) or alloys containing precious metals are formed.

In the thermal assist type magnetic head element portion 501, the write magnetic field generating part 502 and a near-field light generating part 504 are formed.

The near-field light detection optical system 115 is configured to include an objective lens 511, a half mirror 512, an LED light source 513, an imaging lens system 510 including an imaging lens 514, a mirror with a pin hole 522 having a pin hole 521 formed at the center, a light detector 523 which detects the light which has passed through the pin hole 521 of the mirror with a pin hole 522, a relay lens system 524 which causes an optical image formed in the imaging lens system 510 and reflected at the mirror with a pin hole 522 to be formed, and a CCD camera 525 which detects an optical image formed in the relay lens system 524.

Moreover, the near-field light detection control system 530 constituting a part of the control unit 30 in order to generate a near-field light 505 from the near-field light generating part 504 of the thermal assist type magnetic head element portion 501, a laser driver 531 which applies a pulse drive current or a pulse drive voltage 5311 to the near-field light generating part 504 via a waveguide which is not shown, a pulse modulator 532 which adjusts an oscillating frequency of a pulse drive current or the pulse drive voltage 5311 oscillating from the laser driver 531, a control substrate 533 which controls the laser driver 531 and the pulse modulator 532, a bias power source 534 which applies a bias voltage applied to the light detector 523, a lock-in amplifier 535 which draws a signal in synchronization with the vibration of the cantilever 10 from a signal detected by the light detector 523, a control PC 536 which receives an output signal from the light detector 523 detected by the lock-in amplifier 535 and the output signal from the CCD camera 525. The output from the control PC 536 is indicated on a monitor screen 31 of the control unit 30.

In the constitution of the near-field light detection optical system 115 and the near-field light detection control system 530 as described above, the pulse drive current or the pulse drive voltage 5311 controlled by a pulse modulation signal from the pulse modulator 532 controlled by the control substrate 533 from the laser driver 531 causes the pulse laser to be incident into the near-field light generating part 504 of the thermal assist type magnetic head element portion 501 via a waveguide which is not shown, and generates the near-field light 505 on the surface of the thermal assist type magnetic head element portion 501.

Although the near-field light 505 itself is generated only in a limited region of the upper face of the near-field light generating part 504, if minute particles of precious metals or alloys containing precious metals or the thin film 3 formed on the magnetic film 2 on the surface of the probe 4 of the cantilever 10 get into the generation region of the near-field light 505, scattered light is generated by the near-field light 505 from minute particles of precious metals or alloys containing precious metals or the thin film 3. A scattered light image is formed on the surface of the probe 4 of the cantilever 10 on an image plane of the imaging lens 514 by the scattered light, of this scattered light generated, which has passed through the half mirror 512 which is incident in the objective lens 511 of the imaging lens system 510.

The mirror with a pin hole 522 is placed so that the pin hole 521 is positioned at a place where the scattered light image is formed on the surface of the probe 4 on this image plane. Since the size of the probe 4 is sufficiently smaller than the size of the pin hole 521, the scattered light image on the surface of the probe 4 passes through the pin hole 521 and is detected by the light detector 523. In contrast, the light which becomes noise coming from a position other than the surface of the probe 4 reaches a position shifted from the pin hole 521 on the image plane and thus cannot pass through the pin hole 521, and is blocked against the light detector 523. By employing such a constitution, the emission intensity of the scattered light generated on the surface of the probe 4 by the near-field light generated from the near-field light generating part 504 of the thermal assist type magnetic head element portion 501 can be detected by the light detector 523 with a reduced influence of the light which serves as noise.

In contrast, of the light emitted from the LED light source 513, the light reflected on the half mirror 512 to the side of the objective lens 511 passes through the objective lens 511 and illuminates the probe 4 of the cantilever 10 and the thermal assist type magnetic head element portion 501. The image in the region irradiated with this illumination light is formed in the vicinity of the face on which the mirror with a pin hole 522 is placed by the imaging lens system 510 and, the image reflected on the mirror with a pin hole 522 is incident in the relay lens 524 and is imaged again on the exit side of the relay lens 524. By installing the detector face of the CCD camera 525 so that it coincides with the image plane on the exit side of this relay lens 524, the images of the probe 4 of the cantilever 10 and the thermal assist type magnetic head element portion 501 are imaged with a CCD camera 525.

Imaging by this CCD camera 525 is performed before the initiation of the inspection of the thermal assist type magnetic head element portion 501, that is, in a state that a near-field light 503 is not generated from the near-field light generating part 504.

Figure 3A:
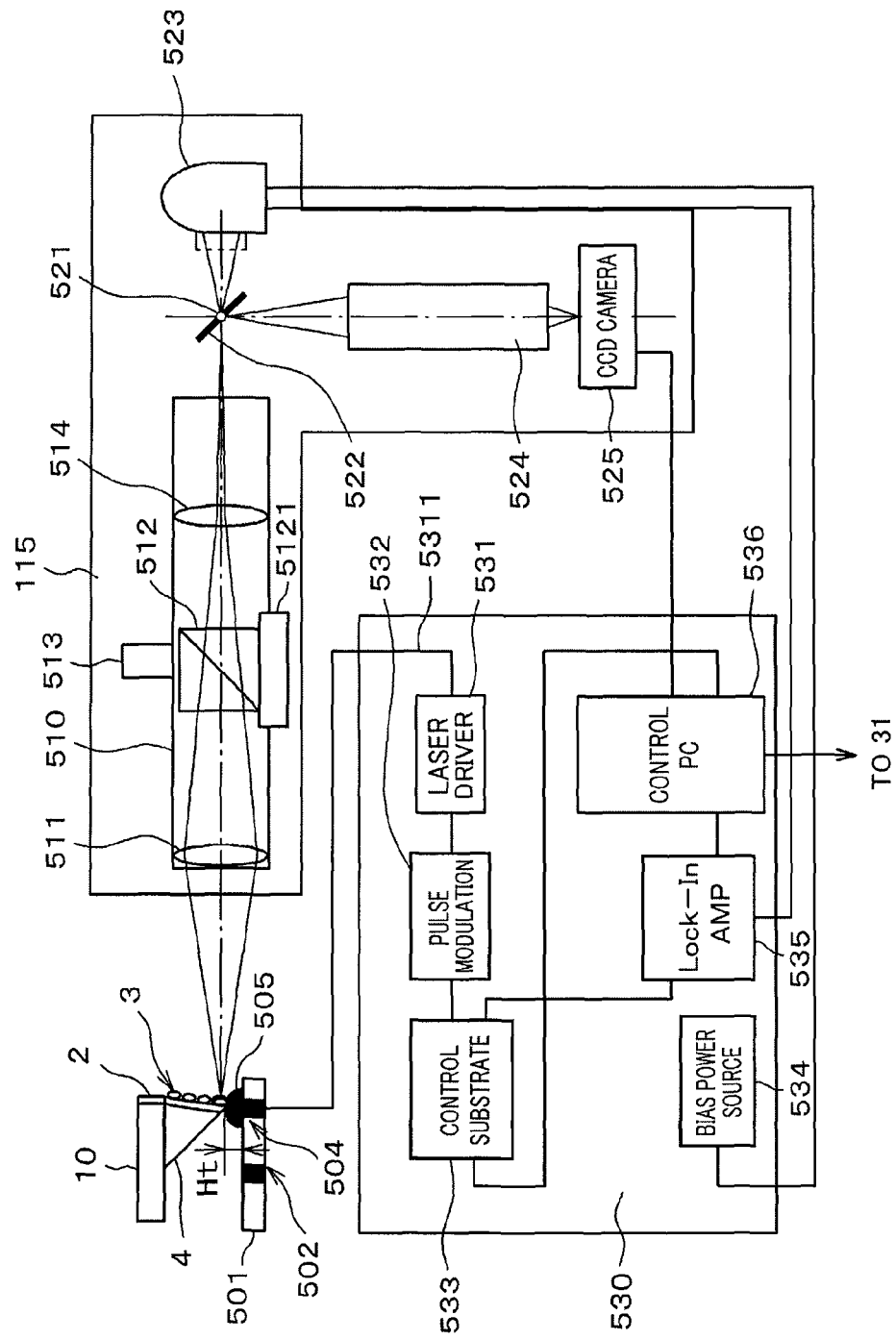
FIG. 3A is a block diagram showing the constitution of a near-field light detection optical system and a detection field light detection control system in an embodiment of the present invention.
Figure 3B:
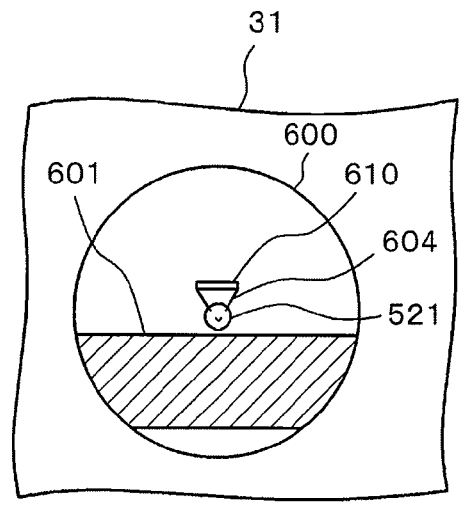
FIG. 3B is an image in which the image of the portion of a pin hole of a mirror with a pin hole imaged by a near-field light detection optical system is missed in an embodiment of the present invention.

Since the image taken by the CCD camera 525 is such that the image of the portion of the pin hole 521 of the mirror with a pin hole 522 is missed, as shown in FIG. 3B, by enlarging and indicating this image 600 on the monitor screen 31, the position of the scattered light generated of a portion which passes through the pinhole 521 among the pictures 601 of the thermal assist type magnetic head element portion 501 including images 610 and 664 of the cantilever 10 and the probe 4 can be checked. When the position of the pinhole 521 relative to the probe 4 is shifted, the relative positions of the near-field light detection optical system 115, the pin hole 521 of the mirror with a pin hole 522, and the light detector 523 can be adjusted while checking the image taken with the CCD camera 525 on the monitor screen 31 so that the scattered light generated at the probe 4 passes through the pin hole 521 to be detected by the light detector 523.

The imaging lens system 510 is provided with a drive unit 5121 for removing the half mirror 512 from the optical axis of the imaging lens system 510, the half mirror 512 of the imaging lens system 510. First, in a state that the half mirror 512 is installed on the optical axis of the imaging lens system 510, the image taken with the CCD camera 525 is displayed on the monitor screen 31 to check and adjust the position of the pinhole 521. Second, after checking and adjustment of the position of the pinhole 521 are completed, the half mirror 512 is removed from the optical axis of the imaging lens system 510 by the drive unit, and a number of thermal assist type magnetic head elements formed on the row bar 40 is inspected sequentially. That is, the half mirror 512 is positioned on the optical axis of the imaging lens system 510 in confirmation and adjustment of the position of the pin hole 521, while when a number of thermal assist type magnetic head elements formed on the row bar 40 are sequentially inspected, is retreated to a position which is off the optical axis of the imaging lens system 510. Thus, by retreating the half mirror 512 to a position which is off from the optical axis of the imaging lens system 510 when the thermal assist type magnetic head elements are sequentially inspected, the light detector 523 can detect during the inspection of thermal assist type magnetic head elements without reducing by half the quantity of light of the scattered light generated at the probe 4 of the cantilever 10 by the half mirror 512. As a result, the scattered light generated at the probe 4 can be detected in high sensitivity.

In a state of being set as mentioned above, the near-field-light detection optical system 115 is controlled by the control part 30, the probe 141 of the probe unit 140 is driven by the drive unit 143, the tip portions 1421 and 1422 of the probe 141 come into contact with the magnetic head element electrodes 41 and 42, respectively, formed on the row bar 40. Moreover, the waveguide from the laser driver 531 and the near-field-light generating part 504 of the thermal assist type magnetic head element 501, which are not illustrated, are brought into connection.

Accordingly, the signal 301 (alternating current 1431 and pulse drive current or pulse drive voltage 5311) outputted from the control unit 30 is brought into such a state that it can be provided to the thermal assist type magnetic head elements formed on the row bar 40. In this state, the thermal assist type magnetic head element 501 of the target of inspection on the row bar 40 sucked by a suction means (not shown) provided at the rest 114 becomes capable of generating a magnetic field from the write magnetic field generating part 502 and generating near-field light from the near-field light emitting part 504.

Figure 4A:
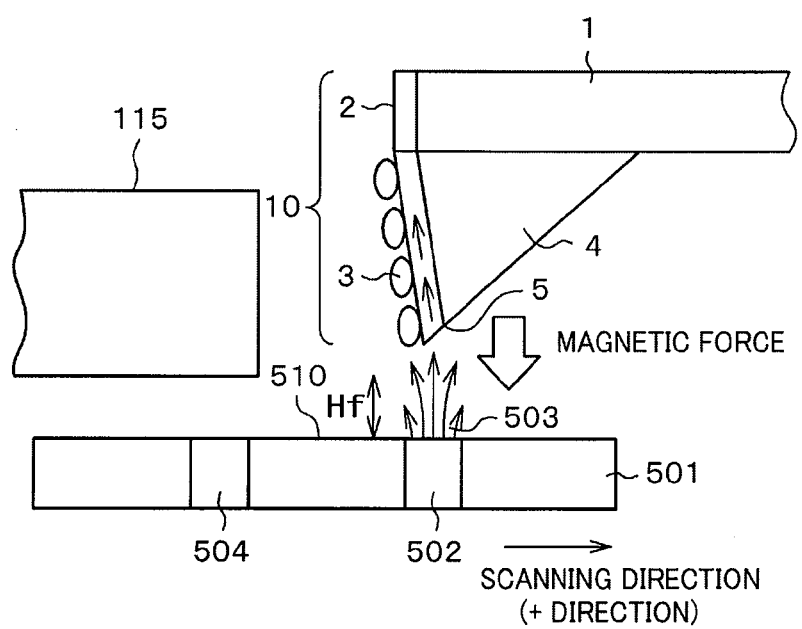
FIG. 4A is a drawing for explaining the detection principle in the inspection unit of a thermal assist type magnetic head element in an embodiment of the present invention, and is a side elevational view of cross sections of the cantilever and row bar which shows the state that the magnetic field generated by the thermal assist type magnetic head element is being measured.

As shown in FIG. 4A, the cantilever 10 which can measure both the above-mentioned near-field light and a magnetic field is disposed in a position opposing a position above the row bar 40 placed on the Y stage 105 of the inspection stage 101. The cantilever 10 is attached to the vibrator 122 provided below the Z stage 104. The vibrator 122 is constituted by piezo elements. An alternating voltage at a frequency near the mechanical resonance frequency is applied by the excitation voltage from the piezo driver 107, and the cantilever 10 is excited to vibrate the probe 4 at the tip portion in the up-and-down direction (Z direction).

Figure 4B:
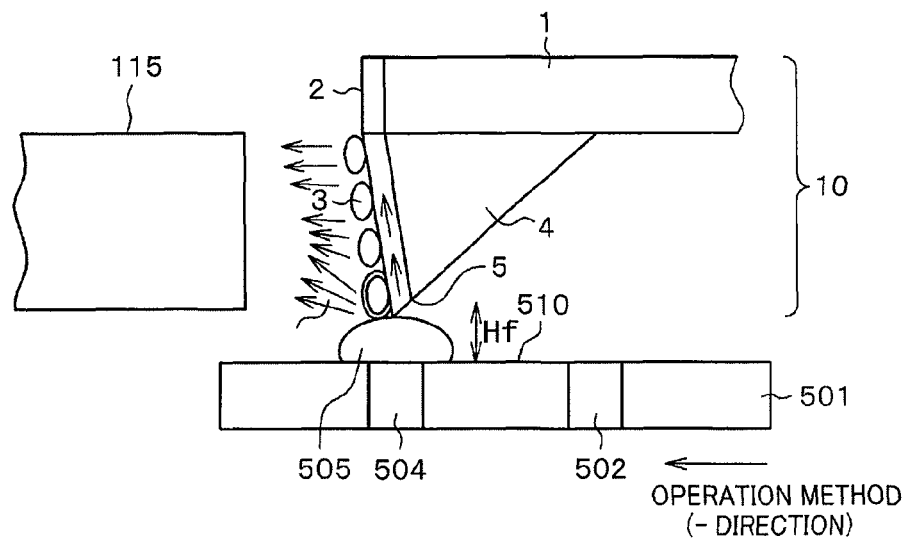
FIG. 4B is a drawing for explaining the detection principle in the inspection unit of a thermal assist type magnetic head element in an embodiment of the present invention, and is a side elevational view of cross sections of the cantilever, detector and row bar, which shows the state that is being measured the near-field light generated by the thermal assist type magnetic head element.

As shown in FIGS. 4A and 4B, the probe 4 of the cantilever 10 in this Example is formed in the tip portion of a plate-like lever 1 of the cantilever 10 with a tetrahedral structure. The lever 1 and the probe 4 are formed from silicon (Si). The thin magnetic film 2 is formed on the front face (the face facing the near-field light detection optical system 115 on the left hand in FIGS. 4A and 4B) of the lever 1 and the probe 4, and minute particles of precious metals or alloys containing precious metals or the thin film 3 are formed on the surface of the magnetic film 2. The cantilever 10 can measure both the near-field light and magnetic field since it is constituted by including the lever 1, probe 4, thin magnetic film 2, and the particles of precious metals or the thin film 3.

That is, the thin magnetic film 2 formed on the surface of the probe 4 determines the sensitivity and resolution in measuring the magnetic field, and picks up the magnetic field of the measured object in measuring the magnetic field 503 generated in the magnetic field generating part 502. Moreover, minute particles of precious metals (for example, gold, silver, etc.) or alloys containing precious metals or the thin film 3 formed on the surface of the probe 4 amplifies the scattered light generated from the minute particles or the thin film 3 by the localized surface plasmon enhancing effect when the probe 4 enters the generation region of the near-field light 506, and to attain a degree of amount of light which can be detected by the near-field light detection optical system 115. However, the minute particles or thin film 3 of precious metals or alloys containing precious metals is not always necessary, and if the magnetic film 2 is sufficiently thin, the scattered light 506 generated from the surface of the probe 4 can be amplified to a degree of amount of light which can be detected by the near-field light detection optical system 115 by the near-field light 505 by the localized surface plasmon enhancing effect when the near-field light falls on the magnetic film 2.

As shown in FIG. 1A, the vibration of the probe 4 of the cantilever 10 in the Z direction is detected by the displacement detecting element 130 which is constituted by including a semiconductor laser element 109 and the displacement sensor 110 including a four-division light detector element. In this displacement detecting element 130, the laser emitted from the semiconductor laser element 109 is radiated on the face opposite to the face on which the probe 4 of the cantilever 10 is formed, and the laser reflected by the cantilever 1 is incident in the displacement sensor 110. The displacement sensor 110 is a four-division sensor in which a light receiving surface is divided into four regions, and the laser incident in the light receiving surfaces divided of the displacement sensor 110 are photoelectrically converted respectively to be output as four electrical signals.

Herein, the displacement sensor 110 has a light receiving surface divided into four divisions, and when the laser is radiated from the semiconductor laser element 109 in a state that the cantilever 10 is not vibrated by the vibrator 122, that is, in a static state, is placed in such a position that the reflected light from the cantilever 10 is equally incident into the four divisions of the light receiving surface. The differential amplifier 111 performs a predetermined arithmetic processing on differential signals of the four electrical signals outputted from the displacement sensor 110 and outputs to the DC converter 112.

That is, the differential amplifier 111 outputs displacement signals corresponding to differences between the four electrical signals outputted from the displacement sensor 110 to the DC converter 112. Therefore, in a state that the cantilever 10 is not vibrated by the vibrator 122, the output from the differential amplifier 111 becomes zero. The DC converter 112 is constituted by an RMS-DC converter (Root Mean Squared value to Direct Current converter) which converts the displacement signals outputted from the differential amplifier 111 into direct current signals of the root mean square values.

The displacement signals outputted from the differential amplifier 111 are signals which are corresponding to displacement of the cantilever 10, and become alternating signals since the cantilever 10 is vibrating during the inspection. The signal outputted from the DC converter 112 is output to the feedback controller 113. The feedback controller 113 outputs the signals outputted from DC converter 112 to the control part 30 as signals for monitoring the magnitude of the present vibration of the cantilever 10, while it outputs the signals outputted to the piezo driver 107 from the DC converter 112 through the control unit 30 as a control signal of the Z stage 104 for adjusting the magnitude of excitation of the cantilever 10. This signal is monitored by the control unit 30, and depending on the value, the initial position of the cantilever 10 is adjusted before the initiation of measurement by controlling a piezo element (not shown) which drives the Z stage 104 by the piezo driver 107.

Figure 5A:
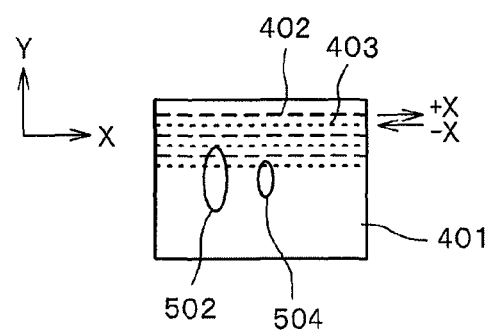
FIG. 5A is a plan view of inspection regions which shows the relationship between an inspection region and the scanning direction of the probe in this inspection region and the magnetic field generation region, and the near-field light generation region in an embodiment of the present invention.

In this Example, by driving the X stage 106 and Y stage 105 by the piezo driver 107 in a state that the cantilever 10 is vibrated at a predetermined frequency by the vibrator 122, the inspection region 401 of the thermal assist type magnetic head element portion 501 as shown in FIG. 5A is scanned by with cantilever 10. One side of the inspection region 401 is from a few hundred nanometers to a few micrometers region.

In the case where the X stage 106 is moved over this inspection region while the cantilever 10 is vibrated up and down, when the probe 4 is scanned from the left side to the right side of the figure along a dotted line 402 in the X direction (the heat assist type head element 501 is moved in the +X direction in FIG. 4A), a magnetic field is generated from the write magnetic field generating part 502 of the thermal assist type magnetic head element portion 501, and the cantilever 10 is driven in an MFM (Magnetic Force Microscope) mode to detect the magnetic field generated. While inspection is performed in this MFM mode, output of laser to the near-field light emitting part 504 from the laser driver 531 is stopped.

In contrast, when the X stage 106 is scanned in the X direction to the left side from the right side in the figure along a dotted line 403 (when heat assist type head element 501 is moved in the –X direction in FIG. 4A), a magnetic field is not generated from the write magnetic field generating part 502 of the thermal assist type magnetic head element portion 501, and the cantilever 10 is driven in AFM (Atomic Force Microscope) mode and the uneven shape of the surface of the inspection region 401 is measured, while the pulse drive current or pulse drive voltage is outputted to the near-field light emitting part 504 from the laser driver 531 to generate near-field light from the near-field-light generating part 504, and the near-field-light is detected by the near-field-light detection optical system 115.

Near-field light is generated from the near-field light generating part 504 by the pulse drive current or pulse drive voltage 5311 oscillating from the laser driver 531. Herein, the luminous efficiency of the near-field light in the near-field light generating part 504 is about a few percent of laser incidence energy. The rest is converted into thermal energy, and the near-field light generating part 504 and vicinity generate head. When a thermal assist type magnetic head element is incorporated in a magnetic disk and writes data in the magnetic disk, the magnetic disk is rotating at a speed of thousands of rpm, and the near-field-light generating part of the thermal assist type magnetic head element is air-cooled by the air trapped between the magnetic disk and the thermal assist type magnetic head element, whereby a rise in the temperature is suppressed. However, since there is no air cooling mechanism in inspecting a thermal assist type magnetic head element, when inspecting by generating near-field light, the temperature of the near-field-light generating part rises. For example, in the case where continuous wave laser generated by applying power of 50 W to the laser diver 531 is incident in the near-field light generating part 504, the temperature of the near-field light generating part is increased to about to 200 to 300° C. in the near-field light generating part 504 and its vicinity.

Figure 6:
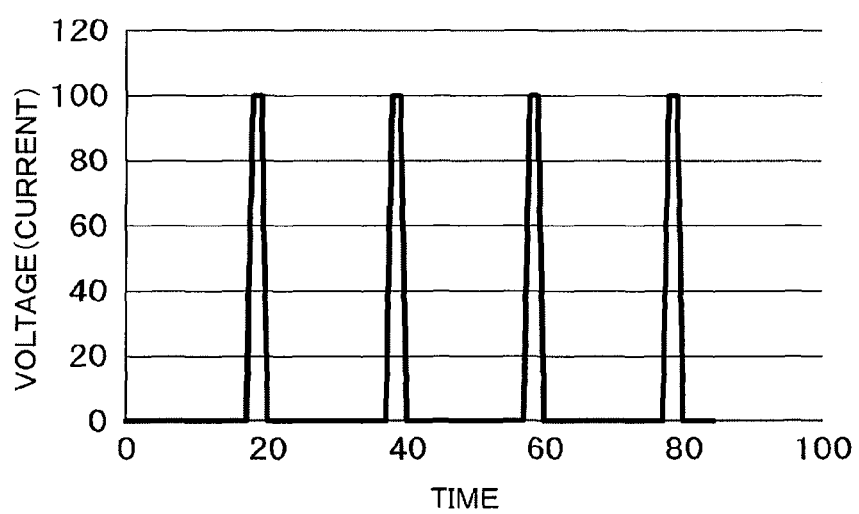
FIG. 6 is an image of the thermal assist type magnetic head element including the cantilever and probe imaged by a CCD camera and indicated on a monitor screen in an embodiment of the present invention.

To reduce the influence of this heat generation, in this Example, as described above, the detection of the near-field light generated in the thermal assist type magnetic head element portion 501 (AFM mode detection) and the detection of the magnetic field (MFM mode detection) are performed alternately, so that the time of continuously generating the near-field light is shortened as much as possible. Moreover, as further shown in FIG. 6, the laser which is incident in the near-field light generating part 504 to produce the near-field light is set to be a pulse drive current or pulse drive voltage, and the laser driver 531 is controlled to keep the duty to 25% or lower to suppress heat generation of the near-field light generating part 504.

Accordingly, the mode is switched between the MFM mode inspection and AFM mode inspection depending on the direction of the scanning of the thermal assist type magnetic head element portion 501 in the X direction relative to the cantilever 10 during the inspection, and incidence of the pulse drive current or pulse drive voltage 5311 to the near-field light emitting part 504 is stopped while inspection is performed on the MFM mode, whereby a rise in the temperature of the thermal assist type magnetic head element portion 501 by the heat generation from the near-field light emitting part 504 can be suppressed, and occurrence of damage in the thermal assist type magnetic head element portion 501 can be avoided.

During these MFM and AFM modes, the height of the probe 4 of the cantilever 10 relative to the surface of the inspection region 401 of the thermal assist type magnetic head element portion 501 is switched. That is, when inspection is performed on the AFM mode, the height of the probe 4 of the cantilever 10 relative to the surface of the inspection region 401 of the thermal assist type magnetic head element portion 501 is set to a height corresponding to the head floating height Hf for writing in a magnetic disk. While on the other hand, in the case of the MFM mode, the height of the probe 4 becomes greater than Hf (the gap between the surface of the inspection region 401 and the tip portion of the vibrating probe 4 at its lowest is set to be greater than Hf). This switching of height is performed by driving the Z stage 104 by the piezo driver 107.

It should be noted that in the example shown in FIG. 5A, the adjacent dotted lines 402 and 403 are indicated to scan different position in the Y direction, but the same position in the Y direction may be scanned, that is, scanning may be so performed that the dotted lines 402 are 403 overlap. In that case, first, the thermal assist type magnetic head element portion 501 is moved along the dotted line 402 to perform the inspection on the AFM mode, and the thermal assist type magnetic head element portion 501 is moved along the dotted line 403 in the opposite direction to perform the inspection on the MFM mode. Second, the thermal assist type magnetic head element portion 501 is moved in the Y direction by 1 pitch to perform the inspection on the AFM mode and the inspection on the MFM mode.

Next, a method for detecting the magnetic field generated from the thermal assist type magnetic head element portion 501 during the MFM mode inspection will be described.

First, the Z stage 104 is controlled by the piezo driver 107 so that the probe 4 is at the height position (gap) relative to the thermal assist type magnetic head element portion 501 during the MFM mode inspection. In contrast, when an alternating current 1431 is applied in a state that the tip portions 1421 and 1422 of the probe 142 is driven by the drive unit 143 of the probe unit 140 and are in contact with the electrodes 41 and 42 formed on the row bar 40, respectively, the write magnetic field 503 occurs from the write magnetic field generating part 502 of the write circuit portion 43. At this time, the output of the laser from the laser driver 531 to the near-field-light generating part 504 is shut off. Next, in a state that the cantilever 10 is vibrated by the vibrator 122, the X stage 106 on which the row bar 40 is mounted is moved in the +X direction in FIG. 4A at a fixed speed by a piezo-electric element (not shown) controlled by the piezo driver 107, whereby the inspection region 401 of the thermal assist type magnetic head element 501 is scanned by the probe 4 in the direction (+X direction) along the dotted line 402 in FIG. 5A.

If the probe 4 of the cantilever 10 enters into the write magnetic field 503 generated by the write magnetic field generating part 502, a magnetic substance 2 of the thin film formed on the surface of the probe 4 is magnetized, and the probe 4 receives magnetic force, whereby the oscillating state of the cantilever 10 changes. Changes in this vibration are detected by the displacement sensor 110 in FIG. 1A. That is, if the oscillating state of the cantilever 10 changes, the incidence position to the acceptance surface divided into four of the displacement sensors 110 of laser which is discharged from the semiconductor laser element 109 and reflected by the cantilever 10 changes.

By detecting the output of this displacement sensor 110 by the differential amplifier 111, changes in the oscillating state of the cantilever 10 depending on the position to be scanned can be detected. By processing this detected signal in the control part 30, detecting the intensity distribution of the write magnetic field 503 generated by the magnetic field generating part 502 of the thermal assist type magnetic head element portion 501 is allowed. By comparing the intensity distribution of this detected write magnetic field with the reference value set in advance, the quality of the write magnetic field generating part 502 can be judged.

After the probe 4 is moved by driving the X stage 106 by a distance of the X direction the inspection region 401, the driving of the X stage 106 is stopped to stop the inspection in the MFM mode. The mode is then switched to the AMF mode, and the X stage 106 is moved in the opposite direction.

Next, a method for detecting the state of generation of the near-field light from the thermal assist type magnetic head element portion 501 during the AFM mode inspection will be described. During the AFM mode inspection, in a state that the cantilever 10 is driven and vibrated by the vibrator 122, the inspection region 401 is scanned by the probe 4 along the dotted line 403 in the −X direction, changes in amplitude of the cantilever 10 during scanning is detected by the displacement detecting element 130 to obtain the information of unevenness on the surface of the inspection region 401, and at the same time, the scattered light generated from the probe 4 while scanning the upper face of the near-field light generating part 504 is detected by the near-field light detection optical system 115. To perform the AFM mode inspection, first, the Z stage 104 is controlled by the piezo driver 107 so that the probe 4 is in a height position (gap) relative to the thermal assist type magnetic head element portion 501 during the AFM mode. Second, the pulse drive current or pulse drive voltage 5311 outputted from the laser driver 531 is incident to the near-field light generating part 504 of the thermal assist type magnetic head element portion 501 from the probe unit 140.

In such a state, as shown in FIG. 4B, the cantilever 10 is vibrated by the vibrator 122 in the up and down directions relative to the surface (recording surface) 510 of the row bar 40, and the X stage 106 on which the row bar 40 is mounted is scanned in the X direction at a constant speed in the direction (−X direction) opposite to that in the MFM inspection described previously. Changes in vibration of the cantilever 10 during scanning of the X stage 106 are detected by the displacement sensor 110 of the displacement detecting element 130. In contrast, the probe 4 during scanning of the X stage 106 reaches the region where the near-field light 505 is being generated by the near-field light generating part 504, the scattered light 506 is generated from the surface of a portion present in an region in which the near-field light 505 is being generated in the probe 4. The scattered light generated on the surface of this probe 4 is amplified by the localized surface plasmon enhancing effect by the minute particles or thin film 3 of precious metals (for example, gold, silver, etc.) or alloys containing precious metals formed on the magnetic film 3 on the surface of the probe 4. Of this amplified scattered light, the scattered light which is incident into the near-field light detection optical system 115 disposed in the vicinity of the cantilever 10 is detected by the light detector 523.

After the X stage 106 is driven and scanned in the direction opposite to that in the MFM mode by a distance of the X direction of the inspection region 401 by the probe 4, driving of the X stage 106 is stopped to stop the inspection in the AFM mode. Next, the cycle of driving the Y stage 107 and moving the same in the inspection region 401 relative to the probe 4 in the Y direction by a pitch, driving the X stage 106 in the same direction as that in the MFM mode of the previous time and scanning the same in the X direction of the inspection region 401 by the probe 4 is repeated, to scan the front face of the inspection region 401 by the probe 4.

By scanning the entire surface of the inspection region 401 once by the probe 4 in such a manner, the detection of the magnetic field generation region generated from the magnetic field generating part 502 of the thermal assist type magnetic head element portion 501 and scattered light generation region from the probe 4 by the near-field light generated from the near-field light generating part 504 is enabled. By processing this detected signal in the control part 30, the distribution of the magnetic field generated from the magnetic field generating part 502 and the distribution of the intensity of the near-field light generated from the near-field light generating part 504 can be determined. By comparing the distribution of this determined magnetic field and the distribution of intensity of the near-field light with the reference data set in advance, the quality of the state of the magnetic field generated from the magnetic field generating part 502 and the emission of the near-field light from the near-field light generating part 504 (the intensity of magnetic field, the distribution of magnetic field, the shape and position of the magnetic field generation region, the intensity of near-field light, the distribution of near-field light, the shape and position of the near-field light generation region, etc.) can be judged.

Furthermore, the spatial relationship between the write magnetic field (alternating magnetic field) 503 generated by the magnetic field generating part 502 of the thermal assist type magnetic head element portion 501 and the heat assist type light (near-field light) 505 generated from the near-field light generating part 504 can be also measured. Accordingly, the inspection of the write magnetic field of the thermal assist type magnetic head element and the intensity distribution of the near-field light and the spatial relationship of both can be measured in the earliest possible stage during the manufacturing process.

First, in performing the inspection, as explained above, an image taken with the CCD camera 525 of the near-field-light detection optical system 115 displayed on the monitor screen 31 is monitored. At the same time, the positions of the probe 4 during the inspection in the AFM mode, the pinhole 521 of the mirror with a pin hole 522, and the light detector 523 are adjusted in advance.

Figure 7:
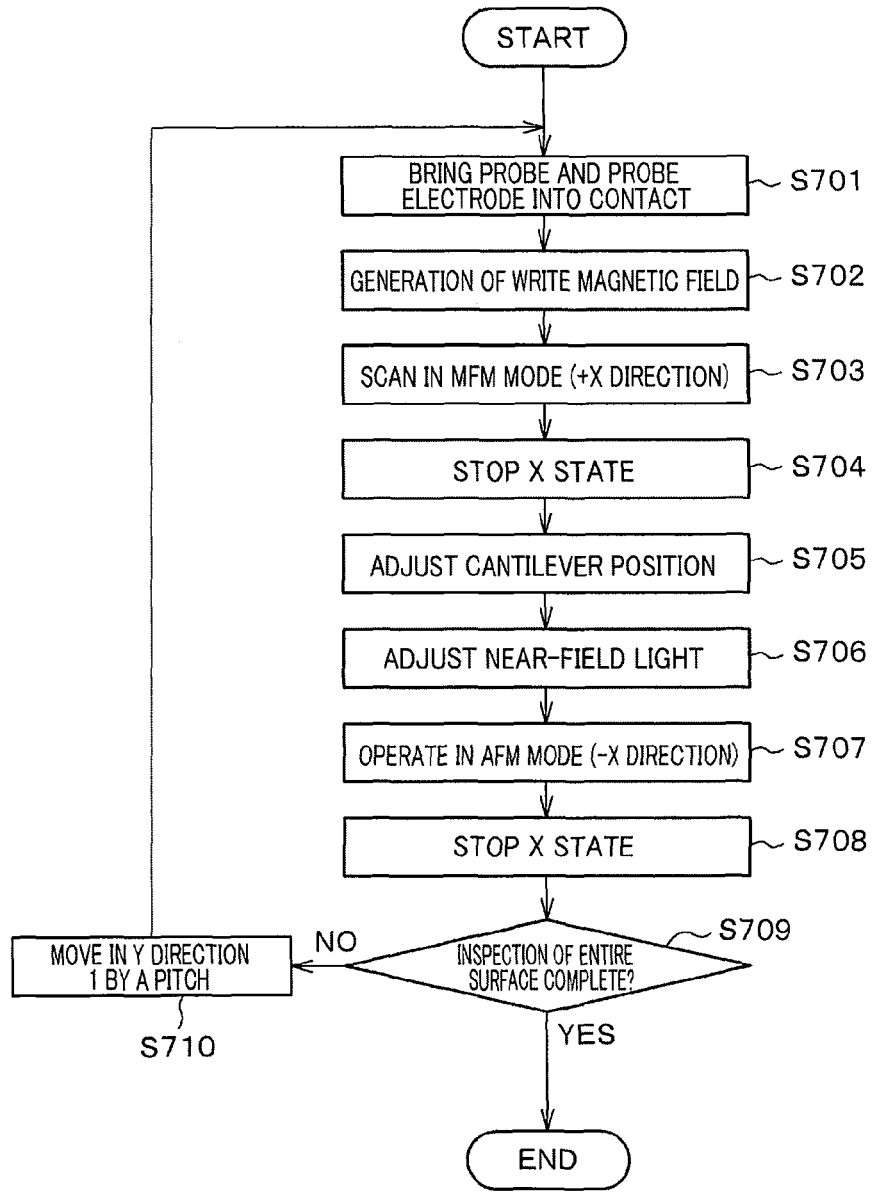
FIG. 7 is a flowchart showing the procedure of the steps of inspection in an embodiment of the present invention.

The near-field-light detection optical system 115 is adjusted in such a manner. In this state, the inspection is executed in the procedure shown in FIG. 7. In the inspection, first, the Z stage is driven and the cantilever 10 approaches the position for inspection in the MFM mode to the inspecting region 401 of the recording surface 510 of the thermal assist type magnetic head element portion 501. The drive unit 143 of the probe unit 140 is operated to advance the probe 141. The tip portions 1411 and 1412 of the probe 141 are brought into contact with the magnetic-head-element electrodes 41 and 42 of the thermal assist type magnetic head element portion 501 formed on the row bar 40 (S701). The signal 301 is provided to the thermal assist type magnetic head element portion 501, and the write magnetic field (alternating current magnetic field) 503 is generated from the magnetic field generating part 502 (S702).

Next, a piezo-electric element (not shown) is driven by the piezo driver 107, while vibrating the cantilever 10 by the vibrator 122. The inspection region 401 is scanned with the cantilever 10 in the MFM mode, while moving the X stage 106 in the X direction at a constant speed (S703). When the probe 4 of the cantilever 10 reaches the end in the X direction of the inspecting region 401, driving of the X stage 106 is stopped (S704). Next, the Z stage is driven to adjust the position of the cantilever 10 so that the interval between the recording surface 510 of the thermal assist type magnetic head element portion 501 and the probe 4 is an interval employed during the AFM mode (S705). The pulse drive current or pulse drive voltage 5311 is incident to the near-field light generating part 504 from the probe unit 140, and a near-field light is generated in the vicinity of the near-field light generating part 504 inside the inspection region 401 (S706).

Next, while vibrating the cantilever 10 by the vibrator 122, a piezo-electric element (not shown) is driven by the piezo driver 107, and to move the X stage 106 in the −X direction at a constant speed. Simultaneously, the inspecting region 401 is scanned with the cantilever 10 in the AMF mode (S707). When the probe 4 of the cantilever 10 reaches the end of the side opposite to the X direction of the inspecting region 401, driving of X stage 106 is stopped (S708).

Next, whether or not the entire surface of the inspecting region 402 is inspected (S709) is checked, and in the case where the entire inspection has not been inspected (in the case of NO in S709), a piezo-electric element (not shown) is driven by the piezo driver 107 to move the Y stage 105 in the Y direction by a pitch (S710), and the steps from S701 to S709 are performed.

By executing the process from this S701 to S709, the distribution of the write magnetic field 503 generated from the magnetic field generating part 502 of the thermal assist type magnetic head element portion 501 and the shape of the generation region of the near-field light 505 generated from the near-field light emitting part 504 can be detected only by scanning the all inspection region 401 with the probe 4 once. By processing this detected signal by the control PC 536, the position information of the near-field light emitting part 504 and the distribution information of the magnetic field generated by the magnetic field generating part 502, and the position information of the near-field light emitting part 504 from the intensity distribution of the light assisted light (near-field light) 505, and the information on the shape of the surface of the inspecting region 401 can be obtained. Furthermore, the spatial relationship between the magnetic generating part 502 and the near-field light emitting part 504 from the position information of the magnetic field generating part 502 and the position information of the near-field light emitting part 504 can be determined. This allows checking whether the magnetic field generating part 502 and the near-field light emitting part 504 are formed at a predetermined interval.

According to this embodiment, the write magnetic field (alternating current magnetic field) generated from the thermal assist type magnetic head element 501 formed on the row bar 40 by the inspection unit 100 of the thermal assist type magnetic head and the heat assist light (near-field light) can be detected only by scanning the entire surface of inspection region once with the cantilever 10, and inspection can be performed upstream of the manufacturing process and relatively in a short period of time.

Moreover, according to this Example, since the detection position by the light detector through a pinhole can be checked by the image displayed on the monitor screen, adjustment of the position of the probe and the pinhole are facilitated, which can greatly shorten the time for positioning than in the case where no monitor image is used. Moreover, the detection position is indicated and adjusted on the monitor screen, whereby sufficiently high accuracy of positioning can be ensured.

It should be noted that in the above-mentioned example, the case where the thermal assist type magnetic head element 501 formed on the row bar 40 is inspected, but inspection can be similarly performed even in the state of the head assembly in which the thermal assist type magnetic head element 501 is attached to the gimbal, which is not shown. In this case the shape of the rest 114 may be changed into one that is suitable for mounting the head assembly.

Figure 8:
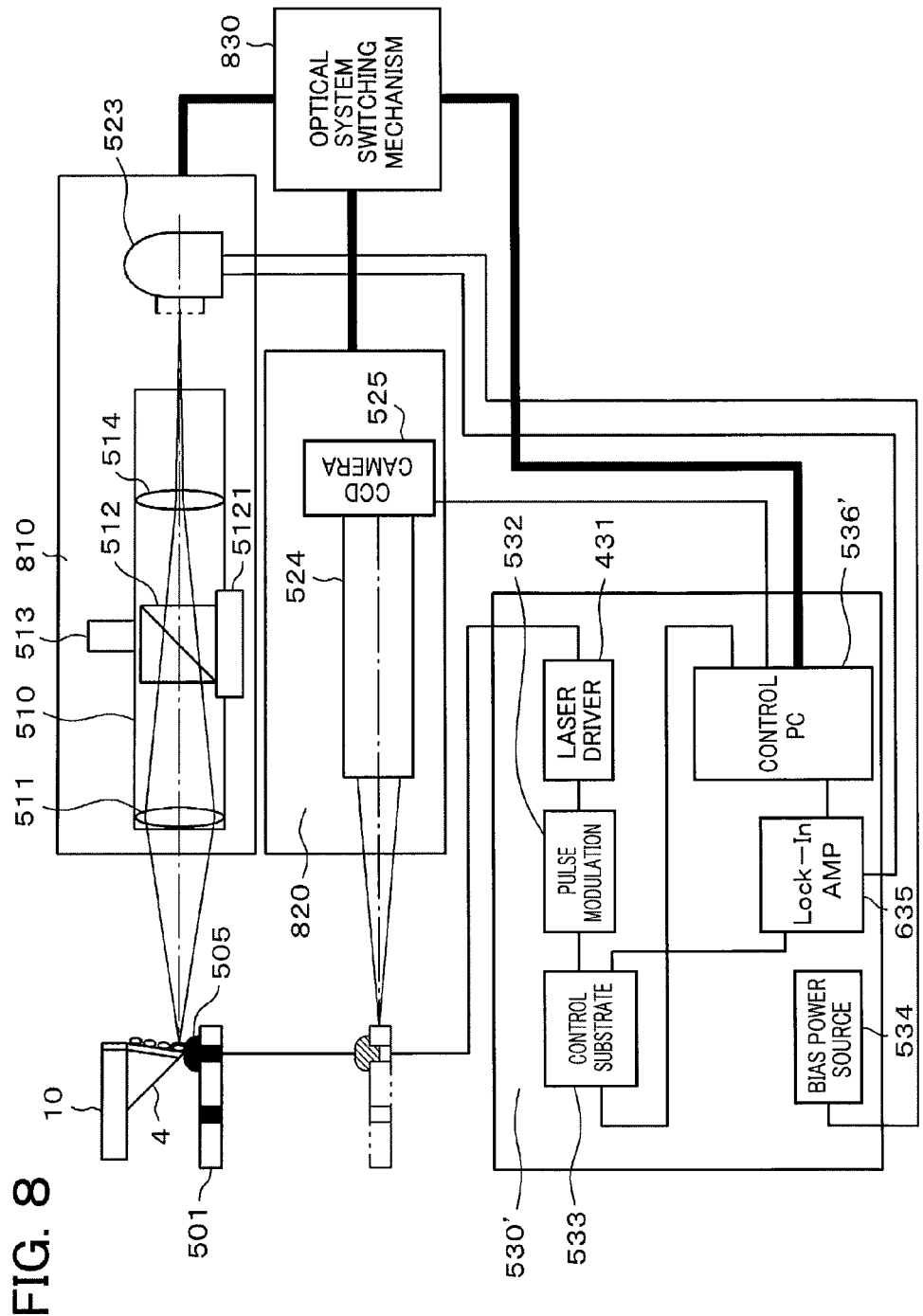
FIG. 8 is a block diagram which shows the constitution of a variant of the near-field light detection optical system in an embodiment of the present invention.

Moreover, in this Example, the configuration in which the near-field detection optical system 115 includes the imaging lens system 510, the mirror with a pin hole 522, the light detector 523, the relay lens system 524 and the CCD camera 525 has been described, but the present invention is not limited to this. For example, as shown in FIG. 8, the near-field light detection optical system 810 having the combination of the imaging lens system 510 and the light detector 523, an observational optical system 820 having the combination of the relay lens system 524 and the CCD camera 525 may be separated, and the two systems may be switched by a switching mechanism unit 830 (for example, stage which is movable in the vertical direction or perpendicular direction in FIG. 8) controlled by the control PC 536' of the near-field light detection control system 530'. It should be noted that in FIG. 7, the same components in the configuration described in FIG. 3A are referred to by the same numbers.

In such a constitution, prior to the inspection, the thermal assist type magnetic head element 501 is observed by the observational optical system 820, and the position of the thermal assist type magnetic head element 501 is adjusted by controlling the X stage 106, the Y stage 105, and the Z stage 104 via the control unit 30 so that thermal assist type magnetic head element 501 comes to a predetermined position in the image outputted from the CCD camera 525, and then the positions of the observational optical system 820 and scattered light detection optical system 810 are switched by driving the switching mechanism unit 830. In this case, the spatial relationship between the observational optical system 820 and the scattered light detection optical system 810 is adjusted in advance and switched by the switching mechanism unit 830, whereby a setting for allowing the detection of the reflected light from the probe 4 observed by the observational optical system 820 by the light detector 523 on the optical axis of the near-field light detection optical system 810 is prepared.

Figure 9:
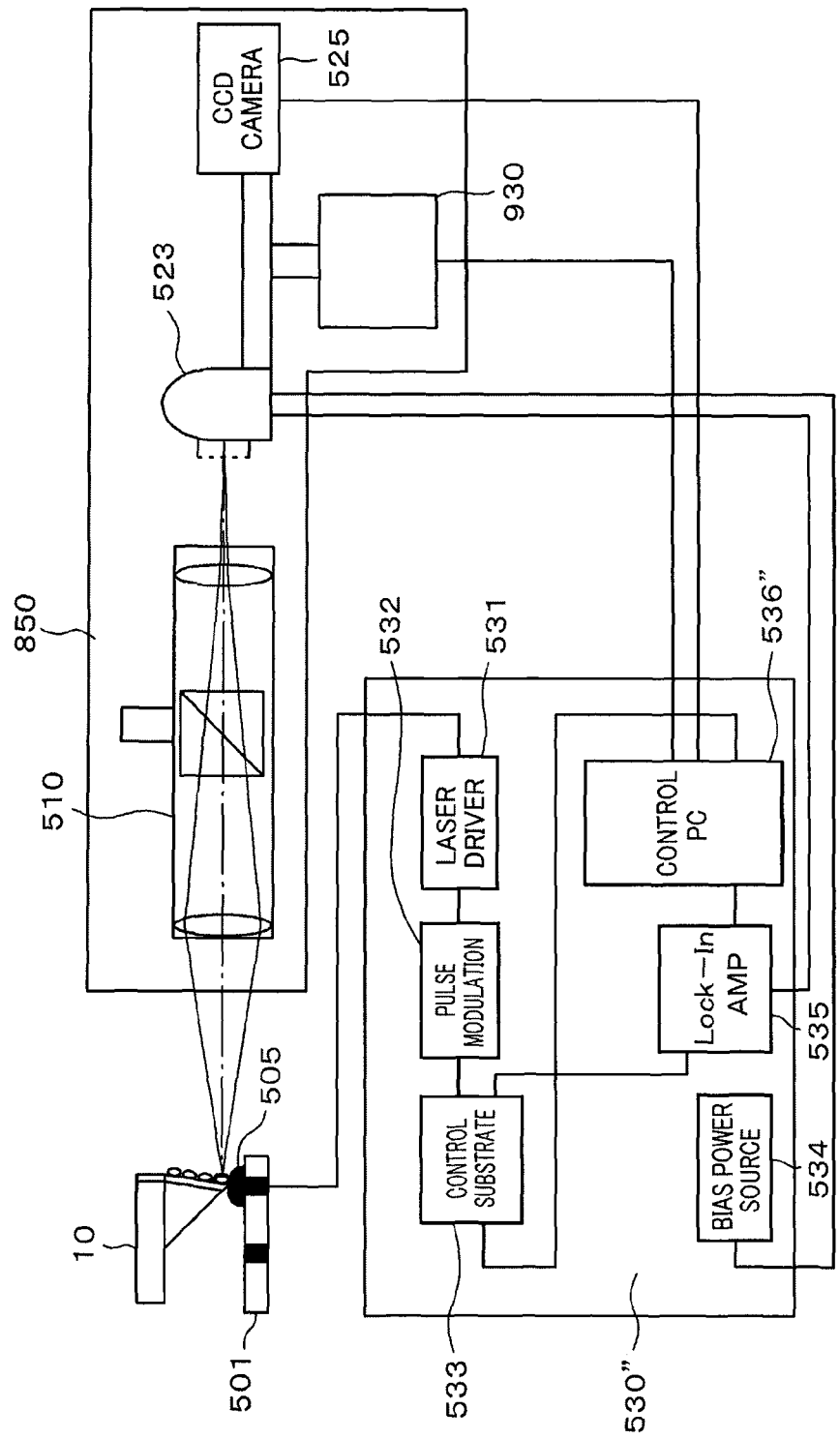
FIG. 9 is a block diagram which shows the constitution of another variant of the near-field light detection optical system in an embodiment of the present invention.

Furthermore, FIG. 9 shows a near-field detection optical system 850, a configuration which may be also employed, in which the relay lens system 524 is deleted, the imaging lens system 510 is shared, and the light detector 523 and the CCD camera 525 are switched by a detector switching mechanism unit 930 controlled by the control PC 536" of the near-field light detection control system 530. The detector switching mechanism unit 930 may be configured by, for example, a rotational table, a rotational arm or like components, which is driven by a motor. It should be noted that in FIG. 9, like components described in the configuration of FIG. 3A referred to by the same numbers.

Figure 5B:
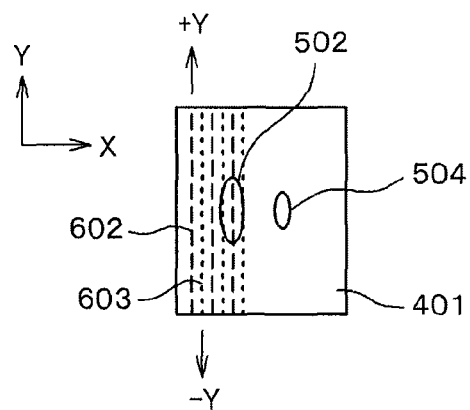
FIG. 5B is a plan view which shows the relationship between the inspection region, the scanning direction and magnetic field generation region of the probe in this inspection region, and the near-field light generation region in this inspection region.

Next, another embodiment different from that mentioned above will be described. This embodiment is different from the embodiment described above in the following respect: in the embodiment described above, as shown in FIG. 5A, when scanning the inspecting region 401 of the thermal assist type magnetic head element portion 501 by the cantilever 10, the cantilever 10 was caused to scan in the X direction and –X direction, but in the other embodiment, as shown in FIG. 5B, the cantilever 10 is caused to scan in the Y direction and –Y direction.

When the cantilever is caused to vibrate in the up and down direction and move over the Y stage 105 in the inspection region 401, when the probe 4 is caused to scan in the Y direction from top to bottom of the figure along the dotted line 602 (the heat assist type head element 501 is moved downwardly in the vertical direction in FIG. 4A), the magnetic field is generated from the write magnetic field generating part 502 of the thermal assist type magnetic head element portion 501, and the cantilever 10 is driven in the MFM mode to detect the generated magnetic field. While inspection is performed in this MFM mode, output of laser to the near-field light emitting part 504 from the laser driver 531 is stopped.

In contrast, when the Y stage 105 is scanned (the heat assist type head element 501 is moved upward in the vertical direction in FIG. 4A) from top to bottom of the figure in the Y direction along the dotted line 603, the cantilever 10 is driven in the AFM mode with no magnetic field generated from the write magnetic field generating part 502 of the thermal assist type magnetic head element portion 501 to measure the uneven shape on the surface of the inspection region 401, while laser is outputted to the near-field light emitting part 504 from the laser driver 531 to generate near-field light from the near-field light generating part 504, which is detected by the near-field light detection optical system 115.

Thus, during the inspection, switching between the MFM mode inspection and the AFM mode inspection depending on the direction of scanning in the Y direction of the thermal assist type magnetic head element portion 501 relative to the cantilever 10 and stopping the application of the pulse drive current or pulse drive voltage 5311 to the near-field light emitting part 504 while inspecting in the MFM mode allows suppressing a rise in the temperature of the thermal assist type magnetic head element portion 501 by the heat generation from the near-field light emitting part 504, and avoiding the occurrence of damage in the thermal assist type magnetic head element portion 501.

In this MFM mode and the AFM mode, the height of the probe 4 of the cantilever 10 is switched relative to the surface of the inspection region 401 of the thermal assist type magnetic head element portion 501. That is, when inspection is performed on the AFM mode, the height of the probe 4 of the cantilever 10 relative to the surface of the inspection region 401 of the thermal assist type magnetic head element portion 501 is set to a height corresponding to the head floating height Hf for writing in a magnetic disk. While on the other hand, in the case of the MFM mode, the height of the probe 4 is set to be greater than Hf (the gap between the surface of the inspection region 401 and the tip portion of the probe 4 is greater). This switching of height is performed by driving the Z stage 104 by the piezo driver 107.

It should be noted that in the examples shown in FIG. 5A as in the example shown in FIG. 5B, the adjacent dotted lines 602 and 603 are indicated to scan different positions in the Y direction, but the same position in the Y direction may be scanned, that is, scanning may be so performed that the dotted lines 602 and 603 overlap. In that case, first, the thermal assist type magnetic head element portion 501 is moved along the dotted line 602 to perform the inspection in the AFM mode, and the thermal assist type magnetic head element portion 501 is moved in the opposite direction along the dotted line 603 to perform the inspection in the MFM mode. Next, the thermal assist type magnetic head element portion 501 is moved in the X direction by a pitch to perform the inspection in the AFM mode and the inspection in the MFM mode.

Although the invention made by the inventors of the present invention above has been described with reference to Examples, the present invention is not limited to the above Examples, and various modifications may be made unless a gist of the present invention is deviated.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. An apparatus for inspecting a thermal assist type magnetic head, comprising:
    a scanning probe microscope unit comprising X and Y tables on which a thermal assist type magnetic head element is to be mounted and being movable in an XY plane, and a cantilever having a probe with a magnetic film formed on a surface of a tip portion thereof;
    a prober unit which supplies an alternating current to a terminal formed on the thermal assist type magnetic head element mounted on the X and Y tables, and applies a pulse drive current or pulse drive voltage to a near-field light emitting part formed on the thermal assist type magnetic head element;
    an imaging unit which picks up images of the prober unit and the thermal assist type magnetic head element;
    an image display unit which displays the images of the prober unit and the thermal assist type magnetic head element taken by the imaging unit;
    a scattered light detection unit having a light detector which detects scattered light generated from the probe of the cantilever when the probe is present in a generation region of near-field light generated from near-field light emitting part formed on the thermal assist type magnetic head element; and
    a signal processing unit which processes an output signal from the scanning probe microscope unit and an output signal from the scattered light detection unit to inspect the thermal assist type magnetic head element, the scanning probe microscope unit outputs the signal by, in a state that the application of the pulse drive current or pulse drive voltage in the near-field light emitting part from the prober unit is stopped and providing an alternating current to the terminal of the thermal assist type magnetic head element to generate a magnetic field on the surface thereof, scanning the surface of the thermal assist type magnetic head element with the probe of the cantilever, and the scattered light detection unit outputs the signal by scanning the probe of the cantilever on the surface of the thermal assist type magnetic head element while generating near-field light from the near-field light emitting part by applying the pulse drive current or pulse drive voltage to the near-field light emitting part from the prober unit in a state that the supply of an alternating current to the terminal is stopped.

2. The apparatus for inspecting a thermal assist type magnetic head according to claim 1, wherein particles of precious metals or alloys containing precious metals are formed on a magnetic film formed on the surface of the probe.

3. The apparatus for inspecting a thermal assist type magnetic head according to claim 2, wherein the signal process unit processes an output signal from the scanning probe microscope unit and an output signal from the scattered light detection unit, and determines the distribution of the magnetic field generated by the thermal assist type magnetic head element and the distribution of near-field light generated in the vicinity of the near-field light emitting part.

4. The apparatus for inspecting a thermal assist type magnetic head according to claim 1, wherein the signal process unit processes an output signal from the scanning probe microscope unit and an output signal from the scattered light detection unit, and determines the distribution of the magnetic field generated by the thermal assist type magnetic head element and the distribution of near-field light generated in the vicinity of the near-field light emitting part.

5. A method for inspecting a thermal assist type magnetic head, comprising the steps of:
    mounting a thermal assist type magnetic head element on X and Y tables of a scanning probe microscope, the scanning probe microscope comprising a cantilever and the X and Y tables, the cantilever having a probe in a tip portion thereof, the probe having a magnetic film formed on the surface thereof, the X and Y table being movable in an XY plane,
    providing an alternating current to a terminal formed on the thermal assist type magnetic head element mounted on the X and Y tables to generate a magnetic field in the thermal assist type magnetic head element;
    in a state that the magnetic field is generated in the thermal assist type magnetic head element, determining the distribution of the magnetic field generated by scanning the surface of the thermal assist type magnetic head element with the probe of the cantilever of the scanning probe microscope;
    applying a pulse drive current or a pulse drive voltage to the near-field light emitting part formed on the thermal assist type magnetic head element mounted on the X and Y tables to generate near-field light from the near-field light emitting part;
    in a state that near-field light is generated from the near-field light emitting part, scanning the surface of the thermal assist type magnetic head element with the probe of the cantilever of the scanning probe microscope to condense and detect scattered light generated from the probe with an objective lens in the generation region of the near-field light;

determining the light emission region and distribution of the near-field light from this scattered light detected; and judging the quality of the thermal assist type magnetic head based on the information of the determined distribution of the magnetic field and the determined light emission region and distribution of the near-field light.

6. The method for inspecting a thermal assist type magnetic head according to claim 5, wherein particles of precious metals or alloys containing precious metals are formed on the magnetic film formed on the surface of the probe, and scattered light amplified by the localized surface plasmon enhancing effect is generated by the particles of precious metals or alloys containing precious metals when a part of the probe is present in near-field light generated in the near-field light emitting part.

7. The method for inspecting a thermal assist type magnetic head according to claim 5, wherein by causing the probe to scan the entire surface of an inspection region set on the thermal assist type magnetic head element once, the distribution of the magnetic field and a light emission region and distribution of near-field light in the inspection region are determined.

8. A method for inspecting a thermal assist type magnetic head, comprising the steps of:

mounting a thermal assist type magnetic head element on X and Y tables of a scanning probe microscope, the scanning probe microscope comprising a cantilever and the X and Y tables, the cantilever having a probe in a tip portion thereof, the probe having a magnetic film formed on the surface thereof, the X and Y table being movable in an XY plane;

in a state that the application of a pulse drive current or a pulse drive voltage to a near-field light emitting part formed on the thermal assist type magnetic head element mounted on the X and Y tables is stopped, applying an alternating current to a terminal formed on the thermal assist type magnetic head element and scanning the surface of the thermal assist type magnetic head element in a first direction with the probe of the cantilever of the scanning probe microscope while generating a magnetic field in the thermal assist type magnetic head element to determine the distribution of the magnetic field generated;

in a state that application of an alternating current to the terminal formed on the thermal assist type magnetic head element mounted on the X and Y tables is stopped, applying a pulse drive current or pulse drive voltage to the near-field light emitting part, and scanning the surface of the thermal assist type magnetic head element in a second direction opposite to the first direction with the probe of the cantilever of the scanning probe microscope while generating near-field light from the near-field light emitting part to condense and detect scattered light generated from the probe with an objective lens in the generation region of the near-field light, and determining a light emission region and distribution of the near-field light from the detected scattered light, and judging the quality of the thermal assist type magnetic head based on information of the determined distribution of the magnetic field and the determined light emission region and distribution of the near-field light.

9. A method for inspecting a thermal assist type magnetic head according to claim 8, wherein particles of precious metals or alloys containing precious metals are formed on the magnetic film which is formed on the surface of the probe, and by the particles of precious metals or alloys containing precious metals when a part of the probe is present in near-field light generated in the near-field light emitting part, scattered light amplified by the localized surface plasmon enhancing effect is generated.

10. A method for inspecting a thermal assist type magnetic head according to claim 8, wherein by causing the probe to scan the entire surface of an inspection region set on the thermal assist type magnetic head element once, the distribution of the magnetic field and a light emission region and distribution of near-field light in the inspection region are determined.

* * * * *